United States Patent [19]

Jacobs et al.

[11] 3,937,297

[45] Feb. 10, 1976

[54] MILKING CHAIR APPARATUS

[76] Inventors: Hubert Hudson Jacobs; Virginia Michael Jacobs, both of 1035 N. Hill Ave., DeLand, Fla. 32720

[22] Filed: Apr. 8, 1974

[21] Appl. No.: 458,906

[52] U.S. Cl. .................. 182/13; 297/175; 297/330
[51] Int. Cl.² ........................................ A01K 1/12
[58] Field of Search .................. 297/175, 349, 330; 180/77 S; 105/29 R; 104/147 R, 148 R, 40, 41, 244.1; 119/14.04, 14.03; 182/2, 13, 36, 63

[56] References Cited
UNITED STATES PATENTS

| | | | |
|---|---|---|---|
| 744,187 | 11/1903 | Gibbs | 104/148 R |
| 2,500,815 | 3/1950 | Gerli et al. | 182/2 |
| 2,552,434 | 5/1951 | Klapman | 104/148 R |
| 2,821,312 | 1/1958 | Wiegel | 182/2 X |
| 2,996,140 | 8/1961 | Troche | 182/2 |
| 3,224,528 | 12/1965 | Hubbard | 182/2 |
| 3,236,329 | 2/1966 | Price | 182/63 X |
| 3,810,442 | 5/1974 | Jacobs et al. | 119/14.04 |

*Primary Examiner*—Francis K. Zugel
*Attorney, Agent, or Firm*—Duckworth, Hobby & Allen

[57] ABSTRACT

A mobile milking chair apparatus which is controlled by the operator to place the operator in a position to milk a series of cows in a milking parlor. The chair conveys the operator along a line of cows and can position the operator properly for connecting and disconnecting a milking machine for each cow and then provides for swinging the operator to the opposite side for another series of cows.

9 Claims, 6 Drawing Figures

MILKING CHAIR APPARATUS

BACKGROUND OF THE INVENTION

The present invention relates to milking chairs and especially to a power operated movable milking chair for milking a plurality of cows without the operator moving from the milking chair.

In the past, the most common milking stools have been small lightweight stools which are of the general height required for a person to sit upon to place him in the general area required for milking a cow. There is also a platform available for an operator to stand upon if the need arises. Each cow is milked individually by hand or the stool may be used while connecting the cow to an automatic milking machine. After each hookup the stool can be picked up and moved to the next location for the next cow. Alternatively, the operator may simply walk to each cow, bend over and stay in a bent or kneeling position while connecting up each milking machine. This has been somewhat improved by some of the milking parlors which load cows onto carousels or other cow-moving devices so that the operator may stand in one general position while hooking up each cow to an automatic milking machine. One such system may be seen in my co-pending patent application, Ser. No. 347,162 for Milking System. This prior system operates handily in conjunction with the present milking chair and allows an operator to be moved rapidly from one cow to the next and to adjust the position of the operator for connecting and disconnecting the milking machine from each cow and allows the operator to connect up one row of cows and then automatically move his operating chair to a different position for connecting up a second row of cows to the milking machines and returning to the first row for disengaging the milking machines in a predetermined sequence so that the operator is continuously kept occupied but does not injure his back by the continuous bending, walking, stooping and standing normally required to hook up a large number of milking machines. It should be observed that the present milking stool is particularly useful with my previously mentioned milking system but may also be adapted for use with other systems such as the commonly used carousel milking parlor, or in herringbone, sawtooth, side opening or walkthrough milking parlors.

SUMMARY OF THE INVENTION that

The present invention relates to a mobile milking stool or chair for use in milking parlors for placing the operator in a correct and comfortable position for connecting and disconnecting a milking machine to a cow and for moving one cow to the next to more fully automate milking parlors. The milking stool includes a wheeled frame or platform which is power driven in a forward and backward direction at the control of the operator. An operator's seat is provided which is connected to the platform in a manner that it can swing from one side to the other of the platform and may also be adjusted in an up and down position suitable to the particular operator and for putting him in better position for connecting up individual cows. The seat includes a control system connected thereto so that the operator controls the back and forth movement of the platform and the swinging of the chair as well as other adjustments to the operator's position without the operator leaving his seat. The mobile chair can be hydraulically or electrically operated as desired. Hydraulics or pneumatics are preferred since they eleminate electrical shock hazards in the milking parlor. The movable platform may ride on a track, if desired, and may be used in a variety of milking parlors.

BRIEF DESCRIPTION OF THE DRAWINGS

Other objects, features and advantages of this invention will be apparent from a study of the written description and the drawings in which.

DESCRIPTION OF THE PREFERRED EMBODIMENT

Figure 1:
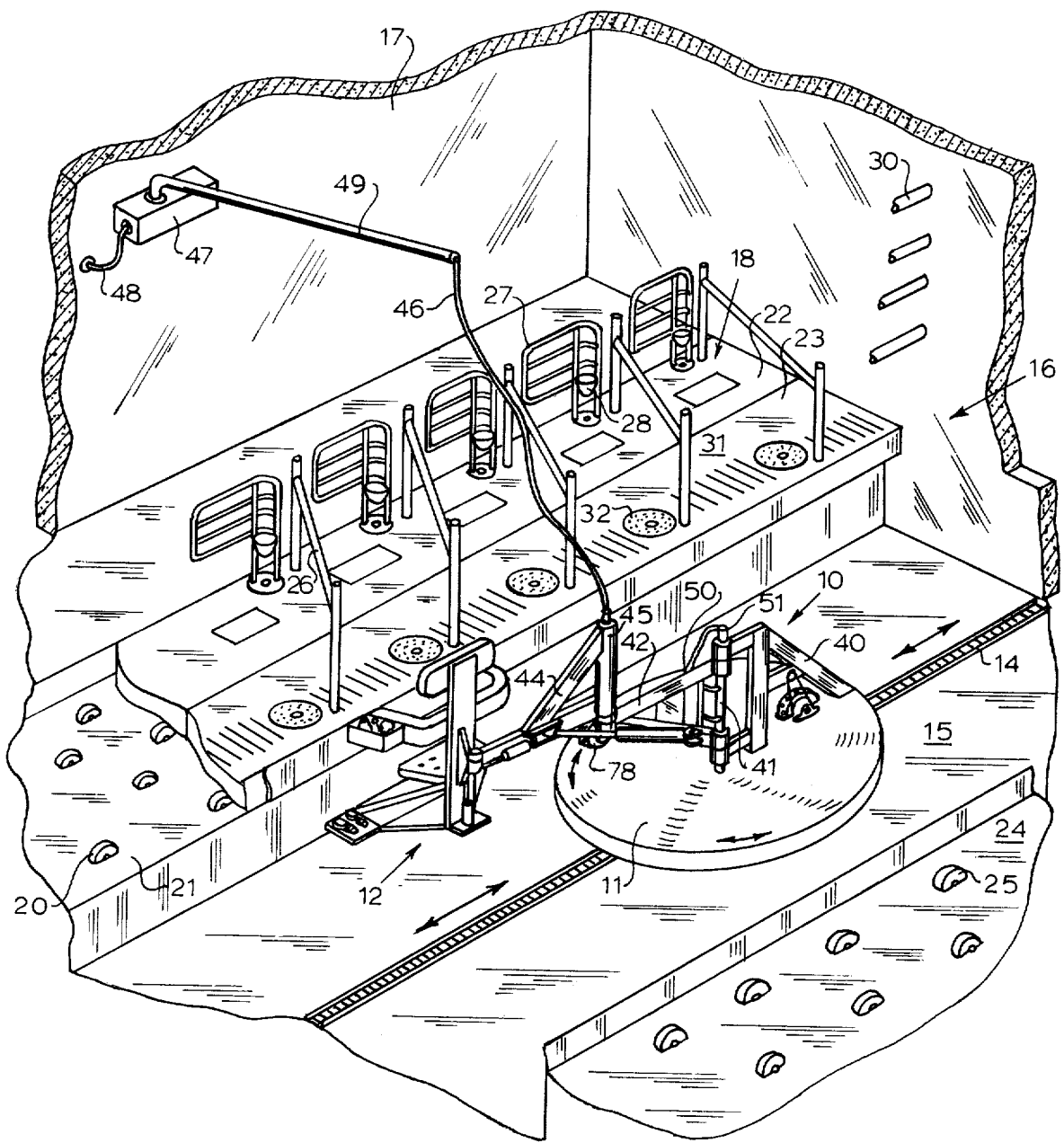
FIG. 1 is a perspective view of a mobile milking chair in accordance with the present invention illustrated next to a milking parlor.
Figure 2:
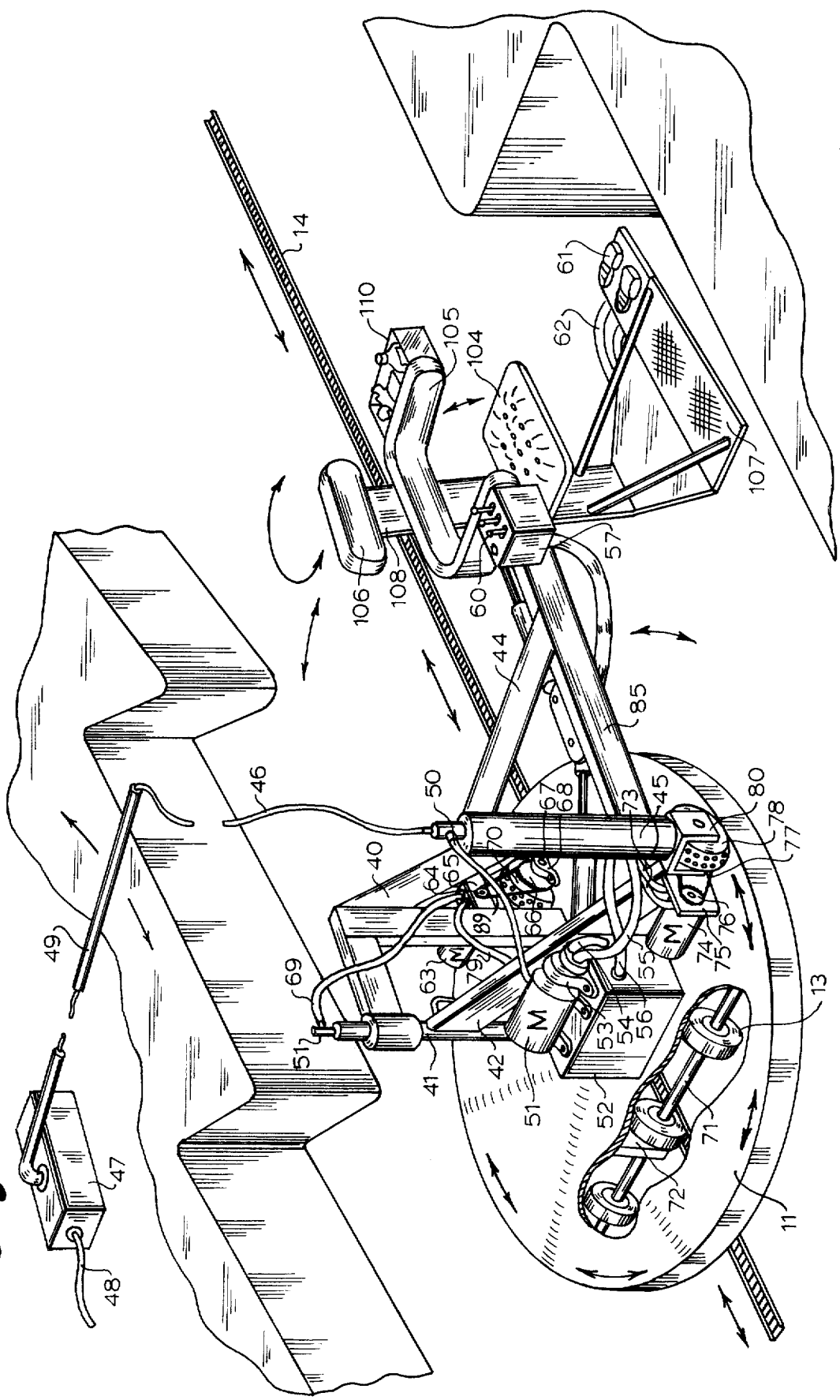
FIG. 2 is a perspective view of the milking chair with portions cut away from the platform.
Figure 3:
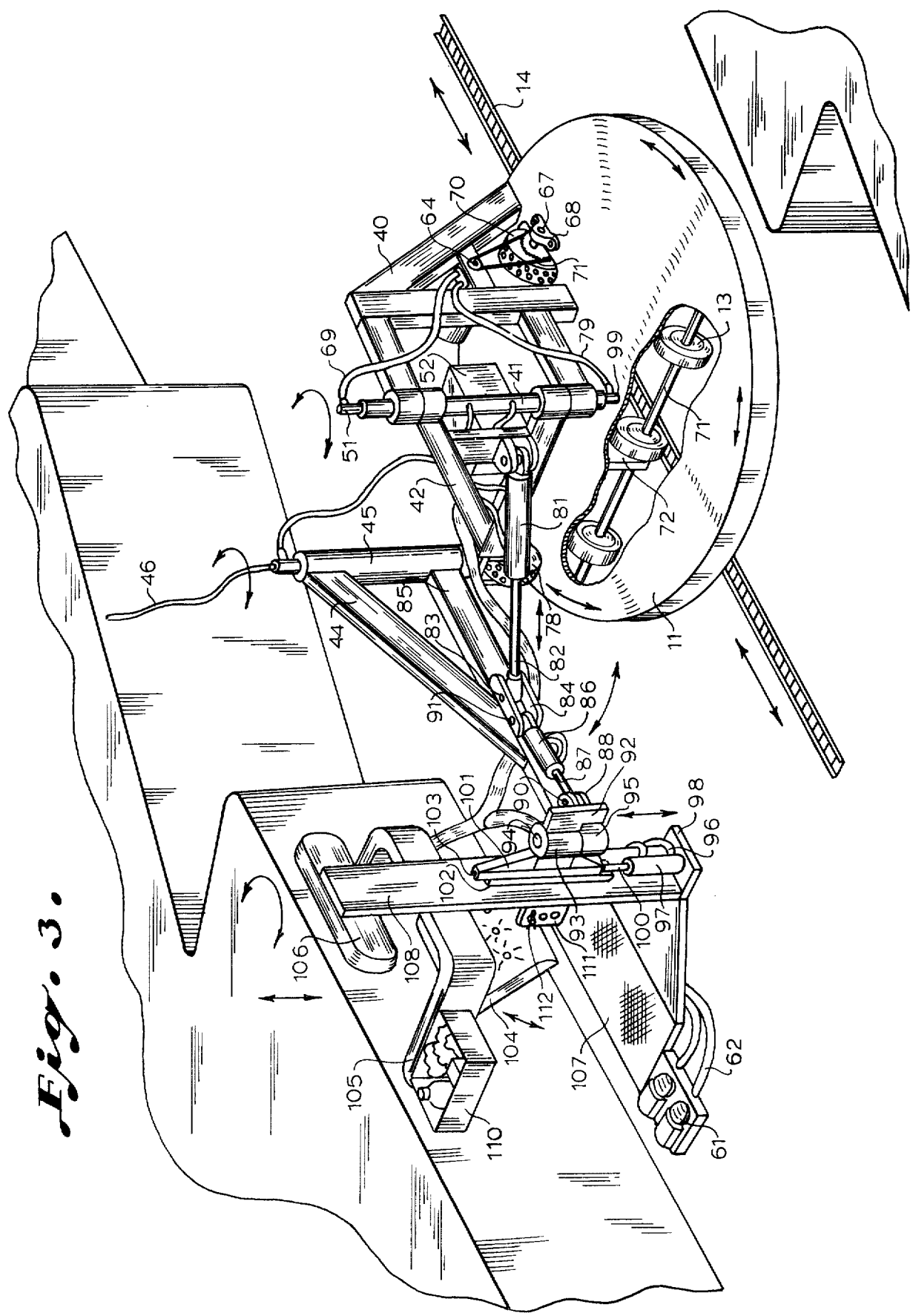
FIG. 3 is a perspective view of the milking chair in yet another position with portions cut away.
Figure 4:
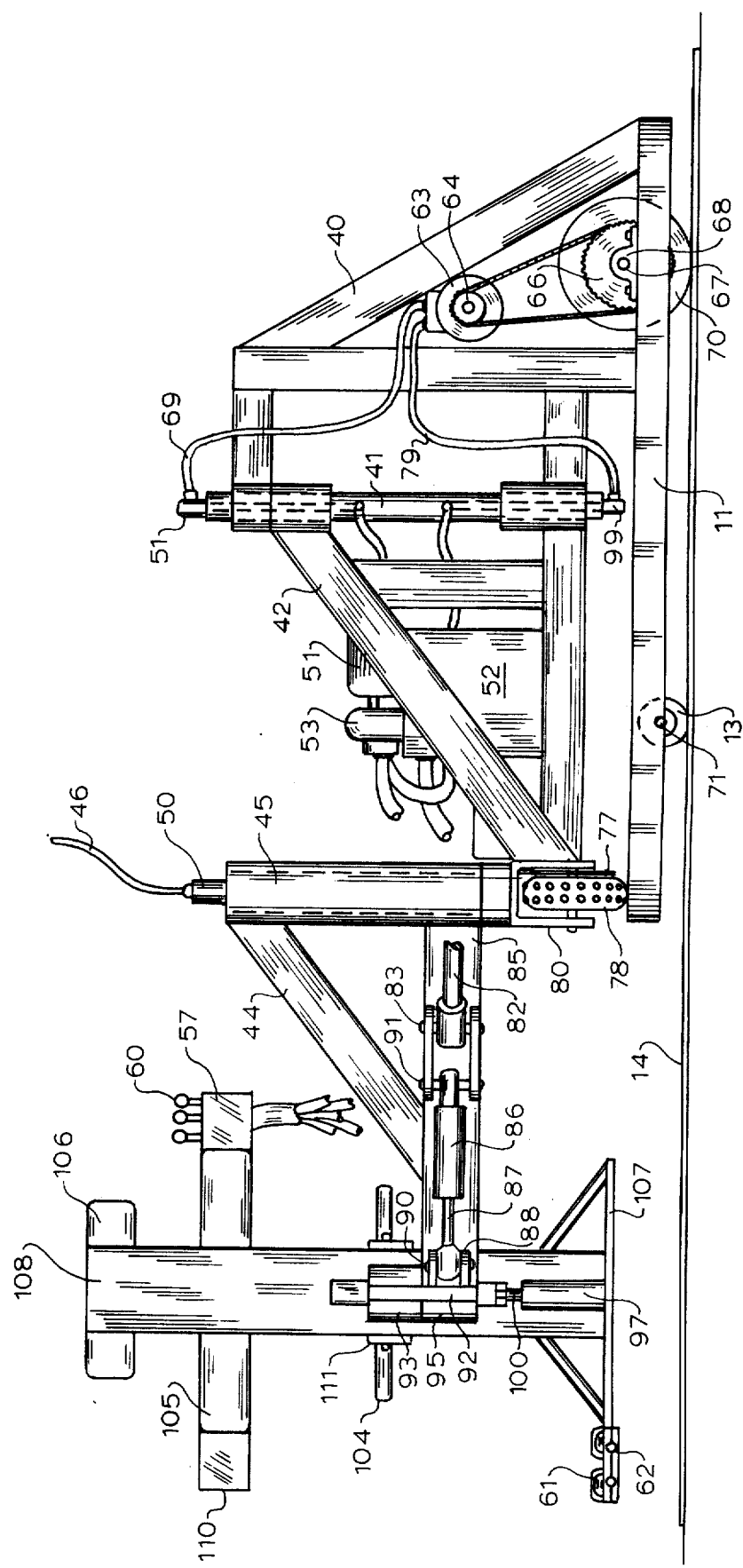
FIG. 4 is a side sectional view of the milking chair in accordance with FIGS. 1 through 3.
Figure 5:
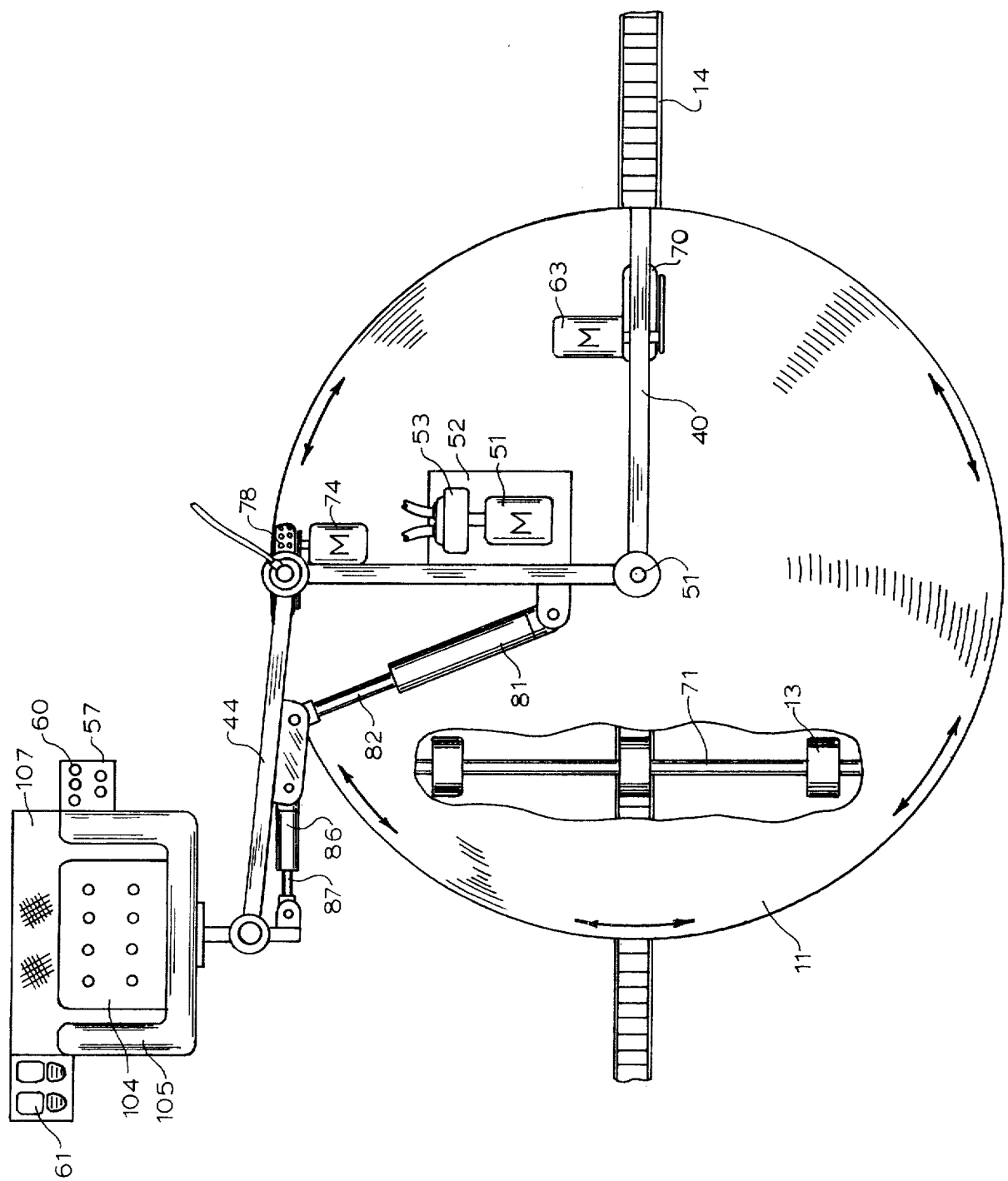
FIG. 5 is a top sectional view with portions cut away of the milking chair in accordance with FIGS. 1 through 4.

Referring now to FIGS. 1 through 6 of the drawings, an automatic milking chair 10 is illustrated generally riding upon a platform or frame 11 and has a chair, stool or seat 12 riding upon the platform 11. The platform 11 rides upon wheels 13 and may have one wheel riding upon a track 14 running down the floor 15 of a milking parlor 16. The milking parlor may include walls 17 along with movable platforms 18 which ride upon wheels 20 attached of a track 21 which platform 18 has a pair of sections 22 and 23 connected together and may be moved into position as illustrated, and then moved away for loading and unloading the cows onto the platform 18 at a position different from the milking location. A second tract 24 has wheels 25 for laying a second platform 18 located in position on the opposite side whereby the chair 12 may be swung around to the opposite platform for milking the cows on a platform on track 24 riding upon wheels 25. Each platform 18 also has a plurality of railings 26 for holding the cows in individual stalls, which stalls are blocked on one end with gates 27 having feeding buckets 28. A plurality of railings 30 are connected to the walls 17 of the milking parlor 16. A bar or grid system 31 allows waste products to be disposed of from the platforms 18 while nozzles 32 allow the cows to be sprayed and damp dried while loaded on the platform 18. This type of milking parlor has been described in my previous patent application Ser. No. 347,162, hereinbefore described, and is mentioned briefly to show the milking stool 10 in contact with the milking parlor for a more clear understanding of the invention.

The milking stool 10, platform 11 has a framework 40 attached thereto along with a central shaft 41 connected to the framework 40 for mounting the chair 12 upon the platform 11. An additional frame 42 connects to the shaft 41 in a rotatable fashion with wheel 43 mounted to the end thereof which in turn is mounted to a frame 44 having cylinder member 45. Frame 44 is in turn attached to the chair 12 and holds the chair 12 in position. Thus the chair 12 can be rotated on the wheel 43 which rotates on the platform 11 and the frame 42 will turn on the shaft 41 so that the operator can be turned in circular fashion substantially around the platform 11, or with modifications the chair could rotate a full circle 25 to position the operator closer or further away from the milking platform 18, as well as to swing the operator from the platform track 21 to platform track 24. For clarity, the frames have been slightly exaggerated so that the operation can be more clearly seen in these views. A flexible electrical cable 46 is connected to a swivel connection 45 at one end to a rotatable mounted rigid pipe 49 at the opposite end which pipe 49 is rotatably or movably connected to an electrical swivel connection and support 47 which in turn is attached to the wall 17 of the milking parlor 16 and is connected to an electrical source through conductor 48.

At this point it can be seen that the milking stool 10 can move back and forth on the track 14 and can also be swung around on the platform 11 and thus has great flexibility in the positioning of the operator and also in the movement from one milking platform to the next.

The electric current that is fed through line 46 through swivel connection 45 can be fed through a cable to an electric motor 51. Electric motor 51 drives the hydraulic system and sits upon a hydraulic reservoir 52, and drives a hydraulic pump 53. Hydraulic fluid is pumped from the reservoir 52 through pipe 54 and produces hydraulic fluid under pressure in the flexible fluid line 55. The reservoir 52 has a flexible return fluid line 56 for returning fluid to the reservoir 52. The line 55 directs the hydraulic fluid under pressure directly to the control box 57, which is controlled from the box 57 through several individual lines by a plurality of hand switches 60 and which may also be controlled by a pair of foot switches 61 which are connected through pipe 62 to the control box 57. Foot control switches 61 are desirable for most workers but all hand control switches 60 are especially useful for some handicapped workers. Hydraulic lines from the hydraulic control box 57 are fed to a hydraulic motor 63 through cylinder 41, hydraulic swivel connection 51 and hydraulic line 69. Hydraulic motor 63 drives a pulley 64 which in turn is connected to a frame 65 which drives a pulley 66 attached to a shaft riding in a bearing 67 and which is connected to a bearing bracket 68 riding upon the platform 11. The shaft and pulley 66 are also connected to a wheel 70 and operation of the hydraulic pressure fluid from the hydraulic box 57, the motor 63 can be driven in a forward or reverse direction to drive the belt 89 in a forward or reverse direction along with the wheel 70 to move the platform 11 along the track 14. The return line 79 from the motor 63 passes through hydraulic swivel connection 99 into cylinder 41 and back through control box 57. Reversing the direction of fluid to hydraulic motor 63 reverses the direction of the direction of travel of the platform 11 on track 14. Platform 11 rides on the wheels 13 which in turn ride on shaft 71 which are connected to the platform 11 by shaft support members 72.

The hydraulic control box 57 is utilized to control by means of hydraulic lines 73 the hydraulic motor 74 which is fixedly attached to a hydraulic motor support bracket 75 and has a pulley 76 for driving a belt 77 which drives a pulley connected to its shaft connected to the wheel 78. The shaft rides in the yoke 80 which supports the wheel 78 and which is attached to the support cylinder 45 and to the frame support 44. Thus by operating the controls 57 the motor 74 can be driven in a forward or reverse direction in the same manner as hydraulic motor 63 to drive the wheel 78 in a forward or reverse direction moving the frame 42 attached to the shaft 41 and also moving the frame 44 to move the chair 12 as the wheel 78 rotates on the platform 11.

The control box 57 may also provide for controlling the hydraulic cylinder 81 which drives a hydraulic cylinder rod 82 attached with a pin 83 to a bracket 84 and to a frame member 85 to swing the frame 44 on the support cylinder 45 to swing the chair 12 back and forth for better positioning of the operator. This is necsssary in order to prevent the chair 12 from running into the platform if the chair has to be moved a substantial distance around the platform 11.

Hydraulic cylinder 86 drives hydraulic cylinder rod 87 conected to a bracket 88 by pin 90 which hydraulic cylinder is also connected by a pin 91 to the bracket 84. Bracket 88 is attached to a support member 92 riding on a cylindrical hollow shart 93 which rides on a shaft 94 and site upon a fixed cylindrical support 95 which fixedly holds the shaft 94. Thus driving the cylinder 86 with the control box 57 in a forward or reverse direction will drive the seat 12 in a partial rotation around the shaft 94 to position the chair at an angle convenient to the operator. Finally, the control box 57 through hydraulic lines 96 may control a hydraulic cylinder 97 attached to a support bed 98 to drive a hydraulic rod 100 to move the support bracket 101 which is movably attached to a support 102 attached to the back of the chair 12 and has a dovetailed track 103 riding thereon so that the chair can be moved up and down at the operator's control. The chair 12 provides a seat portion 104, arm supports 105, back support 106 and a foot support or standing platform 107 connected to a back portion 108. The chair also has a container 110 for holding supplies for the operator along with the foot controls 61 previously discussed. The chair 104 can be further adjusted for a particular operator by the attachment to brackets 111 by means of pins 112. It should be noted that the hydraulic system controls work in a conventional manner with commerically available control components and utilize commerically available hydraulic motors as well as commerically available electric motors.

Figure 6:
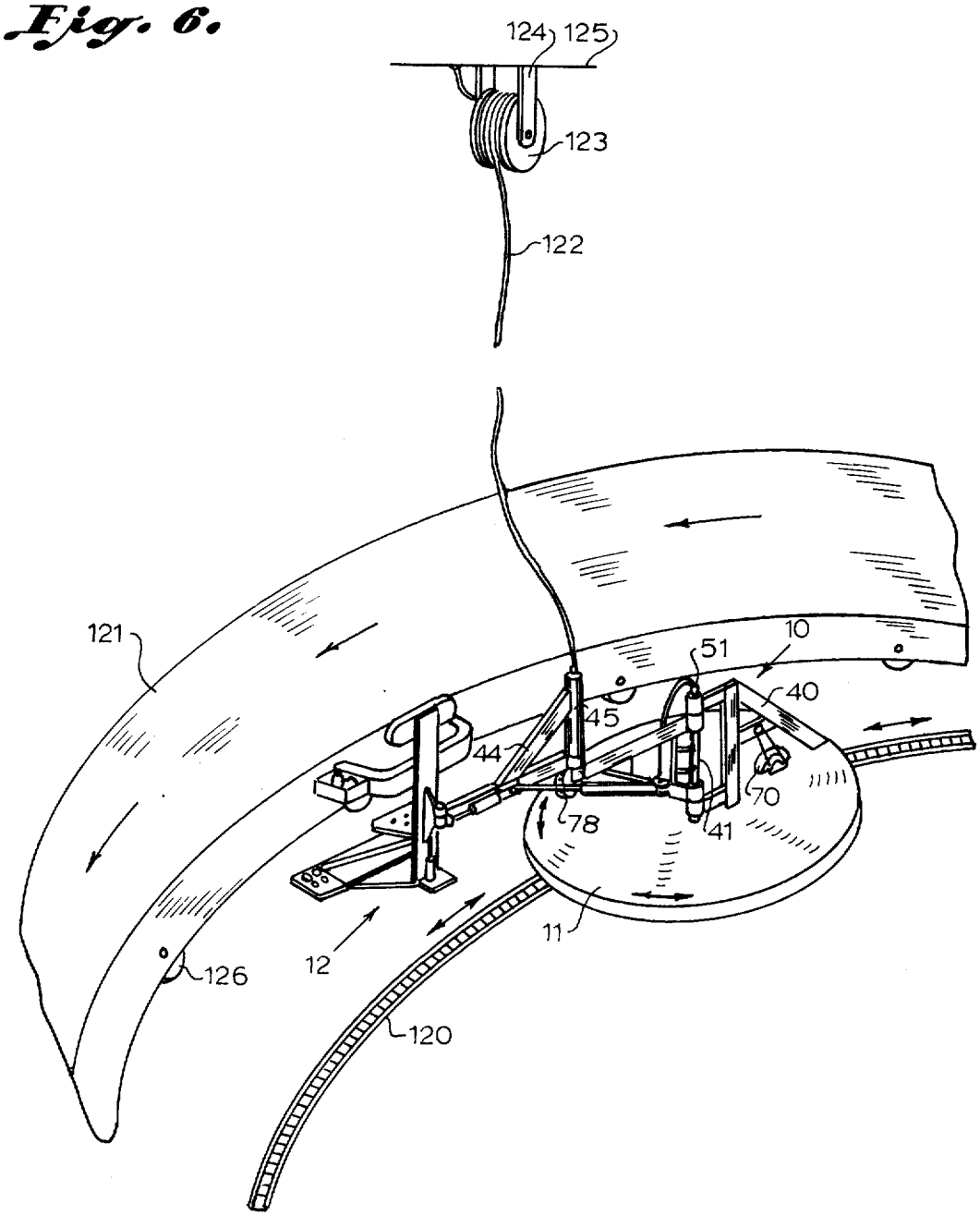
FIG. 6 is a perspective view of a milking chair in accordance with the present invention connected next to a carousel type milking parlor.

FIG. 6 illustrates an alternate embodiment having all of the features in the chair as previously described but riding in a circular track 120 to follow a carousel or rotational type milking parlor 121 and having an electrical cable 122 fed from a spring loaded retractable spool 123 attached by brackets 124 to a roof 125 of a milking parlor. Carousel 121 rides on wheels 126 as illustrated but could be moved in any manner desired without departing from the spirit and scope of the invention.

It should be clear at this point that a milking chair which is operated and movable in a great variety of positions as well as on a track has been provided, but it should also be clear that other variations are contemplated such as having two chairs riding on a single platform without departing from the spirit and scope of the invention. Accordingly, this invention is not to be construed as limited to the particular forms disclosed herein, since these are to be regarded as illustrative rather than restrictive.

I claim:

1. A mobile milking chair comprising in combination:

a. a wheeled frame having a platform supported by wheels attached thereto;
b. drive means for propelling said frame upon actuation by an operator;
c. operator seat means including at least one seat movably attached to said wheeled frame;
d. operator seat support frame attached between said seat means and a center support member and being movably supported on at least one other point on said platform whereby said chair can be shifted around said platform for positioning said seat, said seat support frame having a movable connection between portions thereof for moving one portion and said seat relative to another portion of said seat support frame;
e. drive means for moving said operator's seat relative to said wheeled frame upon actuation by an operator;
f. control means connected to said operator's seat means operatively coupled to said drive means for propelling said frame and to said drive means for moving said operator's seat whereby an operator can position the operator's seat means for connecting and disconnecting cows in a milking parlor; and
g. guide means for guiding said wheeled frame over a predetermined path in a milking parlor when said wheeled frame is propelled by said drive means.

2. The apparatus in accordance with claim 1 in which said operator seat means is supported on a central support member and on at least one support wheel riding on said platform.

3. The apparatus in accordance with claim 1 in which said drive means includes an electrical source connected to said mobile milking chair and to an electric motor mounted on said mobile milking chair, said electric motor operatively connected to drive a hydraulic pump.

4. The apparatus in accordance with claim 3 in which said guide means includes a track in a milking parlor for moving over a predetermined path.

5. The apparatus in accordance with claim 4 having a pair of hydraulic motors, one for driving at least one wheel for moving said wheeled frame in a forward or reverse direction upon operation of said control means by an operator, and a second hydrualic motor for moving said support wheel upon said movable platform to position a chair mounted on said wheeled frame.

6. The apparatus in accordance with claim 5 in which said control means includes foot controls connected to said operator's seat for operation by the feet of an operator whereby the hands of the operator are freed for connecting or disconnecting cows in a milking parlor.

7. The apparatus in accordance with claim 6 in which the hydraulic cylinder is attached to said operator's seat means for raising or lowering said seat upon actuation by an operator.

8. The apparatus in accordance with claim 7 in which said seat is rotatably connected to said wheeled frame attached to a hydrualic cylinder for rotation of said seat on said frame upon actuation by said operator.

9. The apparatus in accordance with claim 5 in which said control means includes hand controls connected to said operator's seat for operation by the hands of an operator.

* * * * *